July 12, 1960

W. W. LANCASTER 2,945,188

TRANSISTOR CIRCUIT

Filed Aug. 27, 1957

INVENTOR.
WILLIAM W. LANCASTER
BY
Fordyce A. Bothwell
ATTORNEY 2,945,188
Patented July 12, 1960

2,945,188

TRANSISTOR CIRCUIT

William W. Lancaster, Philadelphia, Pa., assignor to Philco Corporation, Philadelphia, Pa., a corporation of Pennsylvania Filed Aug. 27, 1957, Ser. No. 680,497

4 Claims. (Cl. 330—24)

This invention relates to transistor circuits, and it is directed particularly to a problem which arose in auto radio receivers involving class A operation of a junction type transistor in the output stage. In such operation of a transistor, frequent burn-out of the transistor occurred and this presented a serious problem.

The present invention has for its principal object the provision of a simple and inexpensive solution of this problem.

In class A operation of a junction type transistor in a common emitter circuit, the emitter is biased forwardly so as to establish the desired direction of the base current, and the applied signal increases and decreases the current according to the instant polarity and amplitude of the signal. When the polarity of the signal is opposite to that of the bias voltage, if the signal is so strong as to override the bias, the direction of the base current is reversed. It was found that this produced a concentration of the collector current in a small area within the transistor and frequently caused burn-out of the transistor.

In accordance with the present invention, an arrangement is provided whereby free flow of base current in the normal direction is permitted but reverse flow of base current is effectively prevented. In the preferred embodiment of the invention, a unilaterally-conductive device, such as a diode, is provided in the base lead of the transistor to prevent reversal of the direction of current flow while permitting substantially unimpeded current flow in the normal direction.

Figure 1:
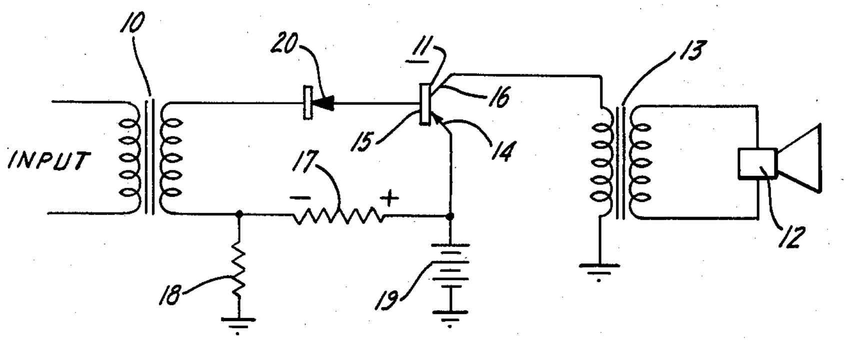
Figure 2:
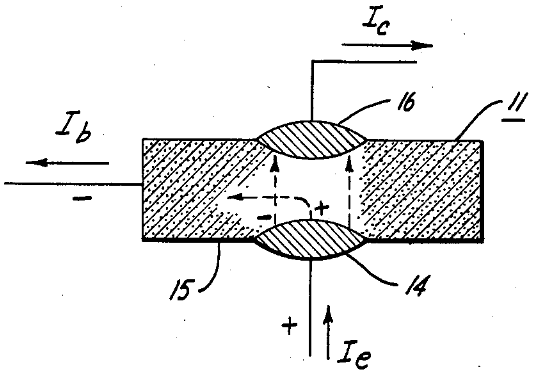
Figure 3:
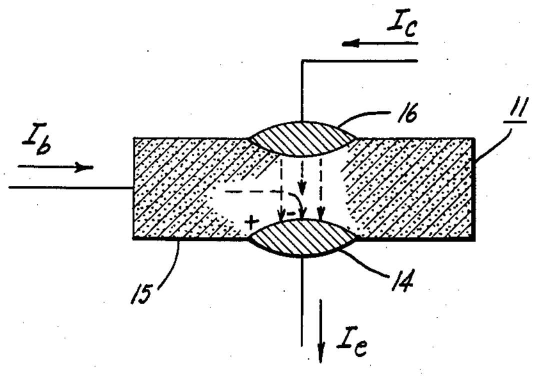

The invention may be fully understood from the following detailed description with reference to the accompanying drawing wherein Figure 1 is a diagrammatic illustration of a transistor circuit including the preferred embodiment of the invention;

Figure 2 is a sectional view taken centrally through the transistor and showing the operation thereof during normal current flow; and Figure 3 is a similar view showing the adverse operation when the direction of current flow is reversed, which operation is precluded by the present invention.

Referring first to Figure 1, a signal of alternating polarity, e.g. an audio signal, is supplied to the input transformer 10 to drive the transistor 11 which in turn drives the load 12 through an output transformer 13, the load in this instance being represented as a sound reproducer. It may be assumed that the transistor is of the P-N-P junction type, and therefore the emitter 14 is biased positively with respect to the base 15, and the collector 16 is biased negatively with respect to the emitter. In the illustrated system the positive or forward bias for the emitter is provided by a voltage divider comprising resistors 17 and 18 connected across a battery 19 which also provides the negative bias for the collector 16.

Disregarding the diode 20 for the present and assuming that the secondary of transformer 10 is connected directly to the base 15 of the transistor, in operation the applied signal increases and decreases the current in the base-emitter circuit according to the instant polarity and amplitude of the signal. As long as the signal does not override the bias in opposition thereto, the direction of current flow remains normal.

Figure 2 depicts the normal operation. This figure is a sectional view taken centrally through the transistor with some of the cross-hatching omitted to enable clear showing of the current paths within the transistor. In the normal operation, current $I_e$ flows into the emitter 14, and the base current $I_b$ flows from the emitter junction through the semiconductor base to the external base connection. This current within the transistor is represented by the broken line arrow extending horizontally. Due to the direction of the base current within the transistor, the outside or edge portion of the emitter junction is caused to be more negative than the center of the junction, as indicated. Because of this, the collector current $I_c$ tends to flow around the outer edge of the junction and along the paths indicated by the vertical broken line arrows. Thus, the collector current is distributed over a relatively large annular area.

Referring again to Figure 1 and still assuming that the diode 20 is absent, when the incoming signal is of polarity opposite that of the bias, if the signal is sufficiently strong to override the bias it will cause reversal of the direction of current flow. Figure 3 depicts the operation of the transistor under this condition. In this instance, the base current $I_b$ flows into the semiconductor base to the emitter 14, and due to its direction of flow, the center of the emitter junction is caused to be more negative than the outer part of the junction, as indicated. This causes the collector current $I_c$ to be pinched in toward the center of the junction, as represented by the vertical broken line arrows. Thus, the collector current is concentrated in a small area at the center of the emitter junction. If the incoming signal is very strong, the current density at the center of the junction may become so high that a collector-to-emitter short may occur and may cause burn-out of the transistor.

In accordance with the present invention, the transistor is protected against burn-out by effectively preventing reverse flow of base current. In the preferred embodiment illustrated, the diode 20 (Figure 1) is provided in the base lead and is poled so that its direction of conduction corresponds to the normal or desired direction of base current flow. When the polarity of the incoming signal is opposite to that of the bias, if the signal is so strong as to override the bias, the diode effectively limits the base current to zero and prevents the destructive reverse current condition depicted in Figure 3. This also limits the collector-to-emitter voltage and prevents it from becoming greater than the open base avalanche voltage of the transistor.

While any suitable unilaterally conductive device may be used for the purpose of this invention, its forward impedance should be low compared to the input impedance of the transistor, as otherwise the gain of the transistor would be reduced. Preferably a germanium diode is employed. By way of example, the 1N91 diode manufactured by General Electric Company has been employed for the purpose of this invention.

This invention has provided a simple and inexpensive solution of the aforementioned burn-out problem in auto radio receivers employing a transistor in the output stage. The invention has gone into commercial use in auto radio receivers manufactured by Philco Corporation, assignee of this application.

Of particular interest is the fact that rejected transistors are presently being used as the diode for the purpose of this invention. To enhance the performance of a transistor as a diode, the emitter may be connected to the base, or the collector may be connected to the base. Thus this invention not only has provided a simple solution of the burn-out problem but one which can utilize rejected transistors which otherwise would be worthless.

While a preferred embodiment of the invention has been illustrated and described, it is to be understood that the invention is not limited thereto but contemplates such modifications and further embodiments as may occur to those skilled in the art.

I claim:

1. In a transistor circuit, a transistor comprising a semiconductor body and emitter and collector electrodes of substantial area joined to said body, an input circuit connected to said body and to said emitter electrode, an output circuit connected to said electrodes, means for supplying to said input circuit an input signal of alternating polarity, means providing in said input circuit a forward bias of a magnitude greater than the normal amplitude of said signal, whereby normally current flows in said input circuit continually in the forward direction established by said bias, with the result that said signal normally causes variation of the amplitude of said current about the bias level and the collector current is distributed over the outer portions of said electrodes, there being the possibility however that at times the input signal may exceed said bias and cause reversal of the current in said input circuit with resulting concentration of the collector current centrally of said electrodes which may cause burn-out of the transistor, and a unilaterally-conductive means serially included in said input circuit connected between the input source and the transistor to prevent such reversal of current while permitting substantially unimpeded flow of the current in the forward direction.

2. A transistor circuit according to claim 1, wherein said transistor is of the P-N-P type.

3. A transistor circuit according to claim 1 wherein said unilaterally-conductive means is a diode.

4. A transistor circuit according to claim 3, wherein said diode is a germanium diode.

References Cited in the file of this patent

UNITED STATES PATENTS

| | | |
|---|---|---|
| 2,787,717 | Kasmir | Apr. 2, 1957 |
| 2,809,303 | Collins | Oct. 8, 1957 |
| 2,845,497 | Barron et al. | July 29, 1958 |